March 19, 1968      T. O. SARE      3,373,821
POND MILL
Filed Dec. 17, 1965
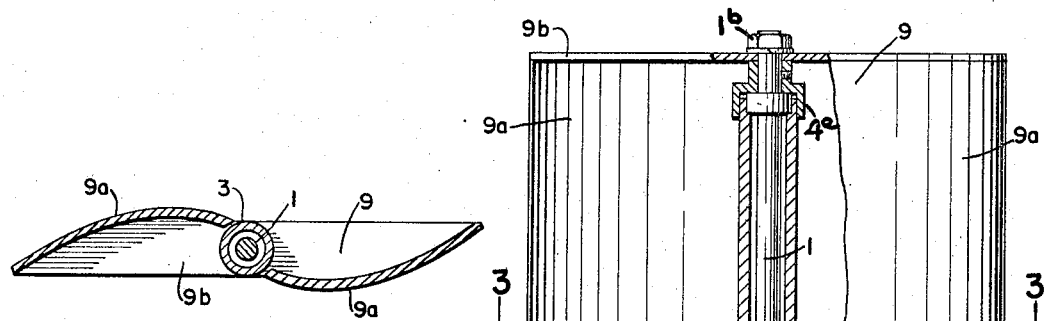
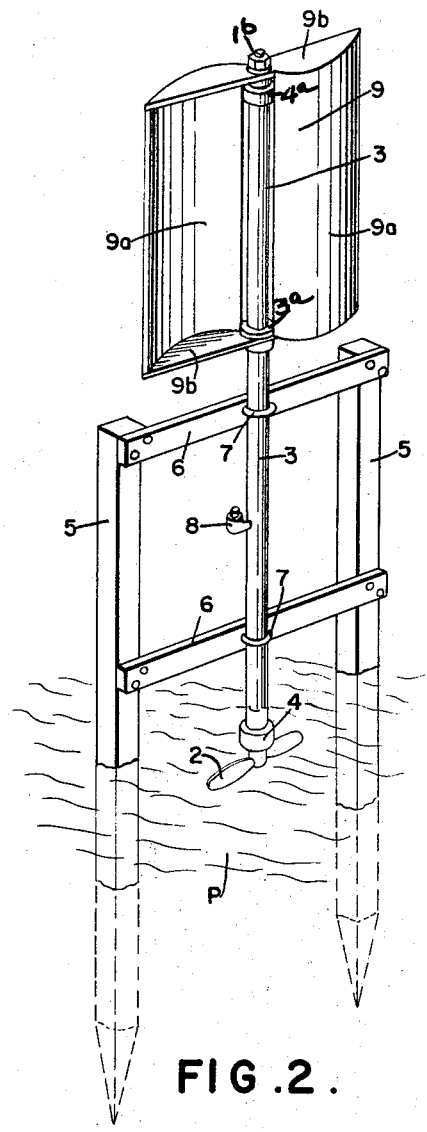
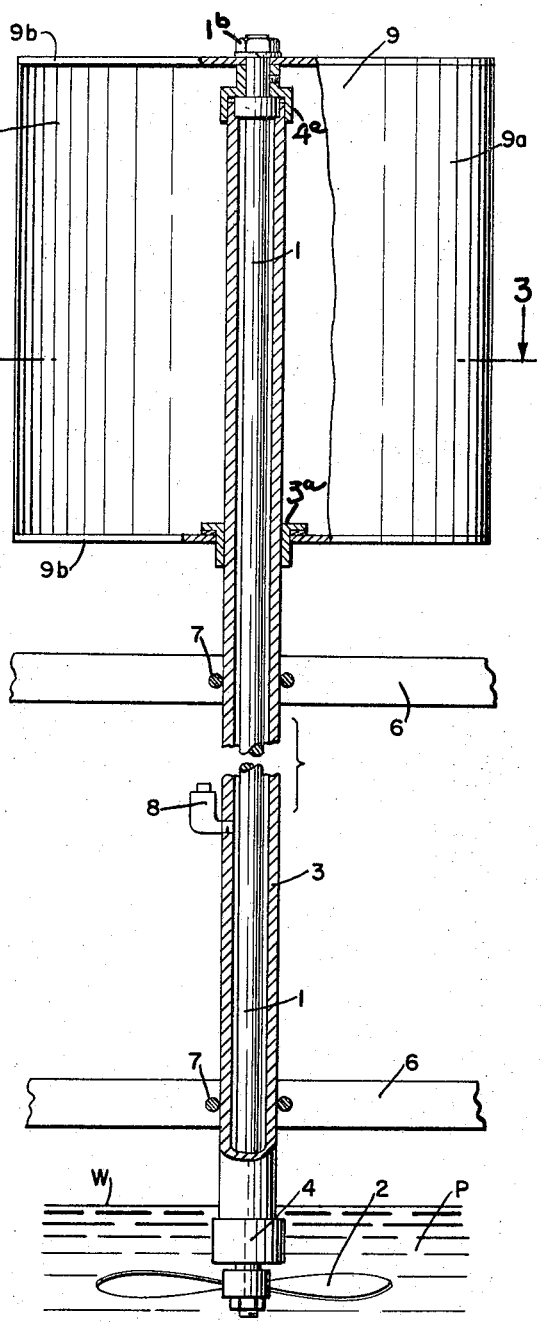
FIG. 3.
FIG. 2.
FIG. 1.
INVENTOR
Ted O. Sare
BY
ATTORNEYS

United States Patent Office 3,373,821
Patented Mar. 19, 1968

3,373,821
POND MILL
Ted O. Sare, Sundance Ranch, Rte. 2,
Willard, Mo. 65781
Filed Dec. 17, 1965, Ser. No. 514,645
7 Claims. (Cl. 170—10)

ABSTRACT OF THE DISCLOSURE

A pond mill for providing an ice-free area in a livestock watering pond disposed in a field exposed to atmospheric weather conditions, comprising a tubular housing; a shaft journaled in said housing and extending above and below the housing; bearings for the shaft at the upper and lower ends of the housing; an impeller on the lower end of the shaft adapted to be submerged below the level of the water in the pond; and a wind-motor secured to the upper portion of the shaft and disposed around the housing for rotating the shaft when wind currents cross the pond, said wind-motor comprising opposed arcuate vanes at opposite sides of the shaft forming an S-shaped rotor exposed to the wind currents over the pond; top and bottom plates connecting the upper and lower ends respectively of the vanes to form a rigid unit, the upper plate being mounted on the upper end of the shaft and the lower plate being journaled on the housing; said rotation of the shaft causing an upward current in the water above the impeller, thereby preventing freezing of the water, and to cause "boiling" up of the water to thaw any ice formation accumulating during windless intervals.

---

This invention is a novel pond mill designed for the purpose of providing an ice-free area on farm ponds which are used as a source of livestock drinking water during the winter months, the mill being wind-driven and therefore requiring no other external source of power, and the mill being simple in design and inexpensive to manufacture.

The principal object of the invention is to provide a pond mill for the above purpose adapted to be mounted vertically on a stand or bracket in or above the pond, the mill having an impeller of the propeller type which is submerged a few inches below the surface of the water in the pond, the impeller being mounted on the lower end of a shaft carrying at its upper end a wind-motor which is exposed to and driven by the wind currents moving across the surface of the pond, whereby the impeller will be rotated by and with the shaft as the wind currents drive the rotor.

Another object is to provide a pond mill of the above type in which the vertical shaft is rotatably mounted in a tubular housing, the top of which is fitted with a bearing assembly, and the bottom of which is fitted with a combined bearing and seal assembly for the lower end of the shaft, and the lower portion of the housing being filled with an antifreezing and lubricating solution such as that used in submergible well pumps, the solution being harmless if it should leak into the water of the pond, and the solution lubricating the seal at the lower end of the housing, the seal preventing water from entering the tubular housing and subsequently freezing during cold windless intervals.

During a winter test period of my pond mill an ice-free area ranging in size from about thirty inches up to ten feet in diameter was provided by the pond mill depending upon the velocity of the wind and the atmospheric temperatures, and the mill was found to be effective in maintaining an ice-free area during overnight subzero temperatures, provided there were sufficient wind currents above the pond to drive, intermittently or otherwise, the rotor and thereby rotate the shaft, driving in turn the impeller submerged below the level of the water in the pond. The impeller is such that rotation thereof creates an upward current in the water that flows from lower, warmer depths to the water surface, and in fact in a stiff breeze the water in way of the impeller will "boil" up. As long as air currents exist, either intermittent or constant, the water in way of the impeller will not freeze. During a cold windless interval the area of water involved may freeze, but with the return of wind currents the resultant operation of the impeller will create upward currents in the water around the shaft and will thaw the ice. Moreover, the antifreeze solution serves to maintain the shaft unfrozen in the tube and operative at all times even though the surrounding water in the pond may at times freeze.

Thus my pond mill provides, and substantially maintains, an ice-free area in the pond, for while a windless interval in the winter might cause the pond to freeze over above the impeller, such windless intervals in the winter are usually not more than a few hours duration, and as soon as the wind currents return the water in the pond adjacent the impeller would by rotation of the impeller and upward flow of water currents therearound thaw the ice thereabove or around.

I will explain the invention with reference to the accompanying drawing, which illustrates one practical embodiment thereof to enable others familiar with the art to adopt and use the same, and will summarize in the claims the novel features of construction, and novel combinations of parts, for which protection is desired.

In said drawing:

FIG. 1 is an elevational view partly in section showing the pond mill disposed above a pond of water with the impeller submerged slightly below the surface of the water in the pond.

FIG. 2 is a reduced perspective view showing the pond mill adjustably mounted upon a suitable support in the pond.

FIG. 3 is a transverse section on the line 3—3, FIG. 1.

As shown, the pond mill preferably comprises a vertical shaft 1 carrying at its lower end an impeller 2 of the propeller type which is adapted to be immersed a few inches below the surface of the water W in an exposed pond P which holds drinking water for livestock, usually situated in one of the farmer's fields.

The shaft 1, above the impeller 2, is housed in a tubular housing 3 of somewhat larger diameter than the shaft 1, said housing having in its lower end a combined seal and bearing assembly 4 through which the shaft 1 passes, the upper end of the housing 3 being provided with a bearing assembly 4a to center the shaft 1 in the housing 3, the upper end of the shaft extending above the upper bearing 4a.

The supporting frame for the tubular housing 3 may consist of a pair of vertical posts 5 which are driven into the ground at the bottom of the pond P so as to remain in upright position, the posts 5 being connected by cross-members 6 carrying U-bolts 7 or the like which embrace the housing 3 as shown and are anchored in the cross-members 6 by means of nuts or the like so that the housing 3 will be vertically adjustable on the cross-members 6 to allow for fluctuations in the water level W in the pond.

As shown, the impeller 2, when the pond mill is mounted on the cross-members 6, extends slightly below the level W of the water in the pond, preferably a distance of a few inches. In the side of the housing 3, above the water level W, is a filling nipple 8, whereby an antifreeze and lubricant solution may be placed in the lower end of the housing 3 around the shaft 1, such solution being one such as made by Du Pont for use in submergible well pumps, the same being harmless if it leaks into the water in the pond, while the solution will lubricate the seal for the shaft 1 and will prevent water from the pond from entering the lower end of the tubular housing 3 and subsequently freezing during cold windless intervals.

On the upper end of the shaft 1, above the housing 3, is a wind motor 9 shown more particularly in FIG. 3 having opposed arcuate vanes 9a on opposite sides of the shaft 1 exposed to wind currents above the pond P, said vanes 9a forming an S-shaped rotor, the vanes 9a being connected together at their upper and lower ends by means of plates 9b. The upper plate 9b is secured to the upper end of the shaft 1 by a nut 1b so as to rotate the shaft 1 as the motor 9 revolves around the housing 3, while the lower plate 9b carries a sleeve 3a rotatably engaging the exterior of the housing 3 whereby the housing helps to support and center the motor 9 and lessens the susceptibility to damage by storm. The cross-sectional shape of the motor is thus of substantial S-shape (FIG. 3) so as to cause rotation of the shaft 1 in accordance with the velocity of the wind currents above the pond P.

During windless periods it is obvious that the wind motor 9 would be stationary and the impeller 2 would not be rotated. However, when wind currents or gusts are passing over the pond P the motor 9 will cause rotation of the shaft 1 in conformance with the wind velocity and thereby cause rotation of the impeller 2 which is so shaped as to cause the water above the impeller 2 to move in an upward current from lower warmer depths to the surface; and in fact in a stiff breeze the water above the impeller 2 would be cause to "boil" up. As long as air currents exist, either intermittent or constant, the water in way of the impeller 2 will not freeze. During a cold windless interval the area of water involved might freeze lightly, but with the return of wind currents the resultant rotation of the impeller 2 will create upward currents or "boiling" in the water around the shaft 1 and will thaw the thin ice which may have formed.

During a winter test period of my pond mill an ice-free area ranging in size from about thirty inches up to ten feet in diameter was provided by the pond mill depending upon the velocity of the wind and the atmospheric temperatures; also the mill was found to be effective in maintaining an ice-free area during overnight subzero temperatures, provided there were sufficient wind currents above the pond to drive, intermittently or otherwise, the motor 9 and thereby rotate the shaft 1, driving in turn the impeller 2 submerged below the level W of the water in the pond.

Thus my pond mill provides, and substantially maintains, an ice-free area in the pond, for while a windless interval in the winter might cause the pond to freeze over lightly above the impeller, such windless intervals in the winter are usually not more than a few hours duration, and as soon as the wind currents return the water in the pond adjacent the impeller would by rotation of the impeller 2 thaw the ice thereabove or around the impeller 2.

I do not limit my invention to the exact form shown in the drawing, for obviously changes may be made therein within the scope of the claims.

I claim:

1. A pond mill for providing an ice-free area in a livestock watering pond disposed in a field exposed to atmospheric weather conditions, comprising a tubular housing; a shaft journaled in said housing and extending above and below the housing; bearings for the shaft at the upper and lower ends of the housing; an impeller on the lower end of the shaft adapted to be submerged below the level of the water in the pond; and a wind-motor secured to the upper portion of the shaft and disposed around the housing for rotating the shaft when wind currents cross the pond, said wind-motor comprising opposed arcuate vanes at opposite sides of the shaft forming an S-shaped rotor exposed to the wind currents over the pond; top and bottom plates connecting the upper and lower ends respectively of the vanes to form a rigid unit, the upper plate being mounted on the upper end of the shaft and the lower plate being journaled on the housing; said rotation of the shaft causing an upward current in the water above the impeller, thereby preventing freezing of the water, and to cause "boiling" up of the water to thaw any ice formation accumulating during windless intervals.

2. In a pond mill as set forth in claim 1, a fixed supporting frame over said pond adapted to engage said housing; and U-bolts around the housing engaging the frame for vertical adjustment of the mill on the frame.

3. In a pond mill as set forth in claim 1, said impeller being of propeller type to cause the surface of the water in the pond thereover to "boil" up during intervals of stiff breezes.

4. A pond mill for providing an ice-free area in a livestock watering pond disposed in a field exposed to atmospheric weather conditions, comprising a tubular housing; a shaft journaled in said housing and extending above and below the housing; a bearing for said shaft in the upper end of the housing; a combined bearing and seal assembly for the shaft at the lower end of the housing; an impeller on the lower end of the shaft adapted to be submerged below the level of the water in the pond; means for introducing an antifreeze lubricant solution into the lower portion of the housing around the shaft; and a wind-motor secured to the upper portion of the shaft and disposed around the housing for rotating the shaft when wind currents cross the pond, said wind-motor comprising opposed arcuate vanes at opposite sides of the shaft forming an S-shaped rotor exposed to the wind currents over the pond; top and bottom plates connecting the upper and lower ends respectively of the vanes to form a rigid unit, the upper plate being mounted on the upper end of the shaft and the lower plate being journaled on the housing; said rotation of the shaft causing an upward current in the water above the impeller, thereby preventing freezing of the water, and to cause "boiling" up of the water to thaw any ice formation accumulating during windless intervals.

5. In a pond mill as set forth in claim 4, a fixed supporting frame over said pond having vertically spaced members adapted to engage said housing; and U-bolts around the housing engaging the members for vertically adjustably mounting the mill on the frame.

6. In a pond mill as set forth in claim 4, said introducing means comprising a filling nipple in the side of the housing intermediate its ends.

7. In a pond mill as set forth in claim 4, said impeller being of propeller type to cause the surface of the water in the pond thereover to "boil" up during intervals of stiff breezes.

References Cited

UNITED STATES PATENTS

| | | | |
|---|---|---|---|
| 781,406 | 1/1905 | Devereux | 259—8 X |
| 1,602,853 | 10/1926 | Maher | 170—36 X |
| 1,656,485 | 1/1928 | Hohlt | 170—33 X |
| 2,827,268 | 3/1958 | Staaf | 103—87 X |

EVERETTE A. POWELL, Jr., *Primary Examiner.*